July 8, 1941. K. L. CHILDS 2,248,659
FRYING APPARATUS
Filed Dec. 18, 1939
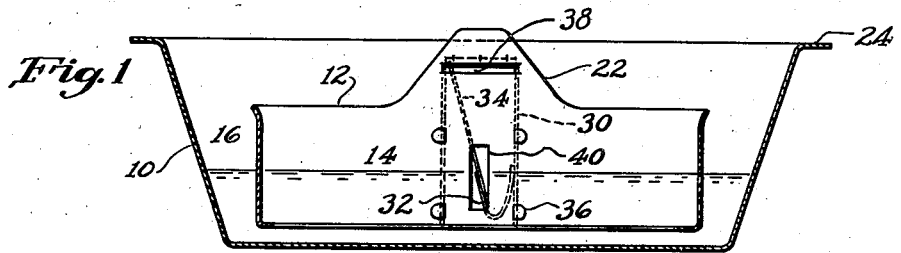
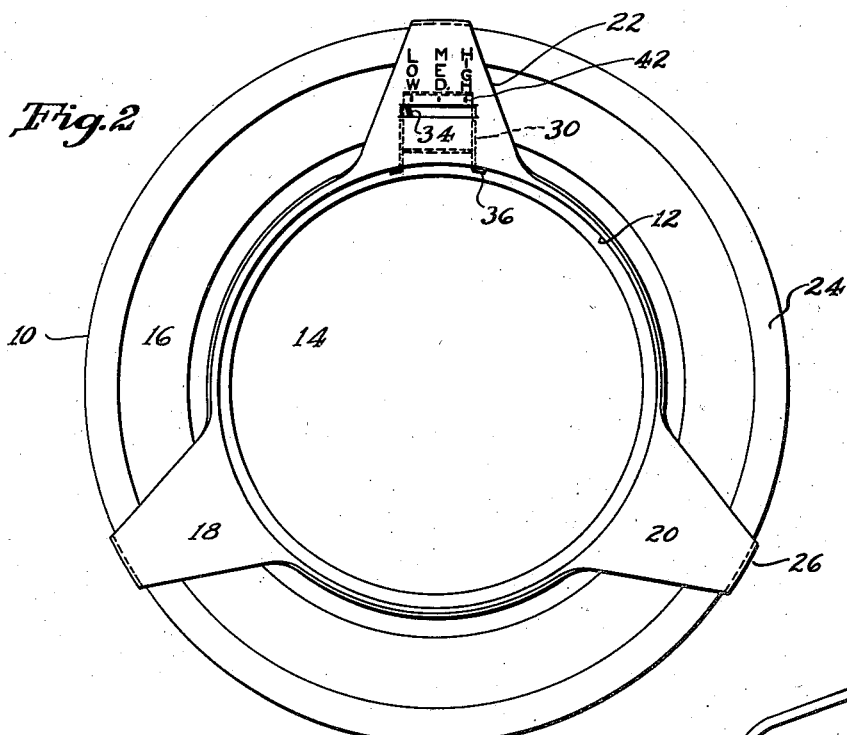
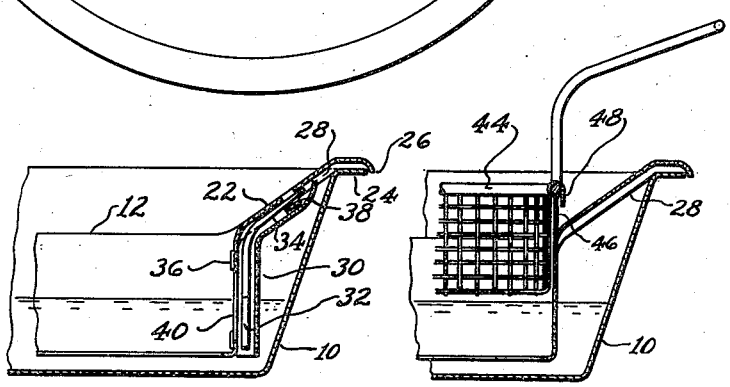
Witness
Paul F. Bryant
Inventor
Kenneth L. Childs
by his attorneys
Fish, Hildreth, Cary & Jenney Patented July 8, 1941

2,248,659

UNITED STATES PATENT OFFICE 2,248,659

FRYING APPARATUS

Kenneth L. Childs, New Haven, Conn.

Application December 18, 1939, Serial No. 309,779

7 Claims. (Cl. 53—7)

The present invention relates to frying apparatus, and more particularly to improvements in kettles or pans of the type disclosed in the present inventor's pending applications for U. S. Letters Patent Serial No. 129,860 filed March 9, 1937, and Serial No. 160,615 filed August 24, 1937, which have matured into Patents Numbers 2,219,949 and 2,219,950 respectively. In certain of its aspects, the present invention is especially intended for use with relatively thin sheet metal pans covered with vitreous enamel, commonly known as agateware, but the invention is by no means limited to such use.

In the frying apparatus of the above applications, a foam controlling rim is provided supported by means directly engaging the heated bottom of the frying kettle. When the foam rim is so supported, it may be desirable to remove it from the kettle while the fat is highly heated in order to clear the kettle or to remove the sediment resulting from continued frying operations. The upper edge of the rim under these conditions may be covered with a layer of hot fat presenting a difficult surface to handle conveniently by the ordinary cloth holder employed in the average domestic kitchen. Also, the rim is held in a central position within the kettle described in the above applications by engagement with the sides of the kettle so that either the rim fits loosely within the kettle, in which case it may be upset or become improperly centered, or it fits the sides of the kettle so tightly that it can not readily be withdrawn without danger of spilling the hot fat. There also may be a possibility of denting or otherwise injuring the sheet metal parts from expansion under heat. Furthermore, if vitreous enamelware in the kettle or rim is employed instead of plain sheet metal, the enamel surface may become chipped or cracked due to expansion during heating and jostling of the parts against each other.

The objects of the present invention, therefore, are to avoid these difficulties and to provide an improved frying apparatus of the type referred to which will not only render the rim easily removable while the kettle is in heated condition, but also will be adaptable both to vitreous enamelware construction as well as to the use of plain sheet metal. Another object is to provide a novel and improved construction for a foam controlling rim on which a thermometer is mounted, the scale of the thermometer being more readily visible than heretofore, and the parts being easily replaceable without the use of special care or equipment. Accordingly, a feature of the present invention is to provide a frying kettle adapted to be heated along its bottom surface, with a removable foam controlling rim for separating the fat containing space in the kettle into a central frying zone and a foam receiving channel, in which the rim is arranged with outwardly extending means supported entirely by the side walls of the kettle in spaced relation to the kettle bottom so that there is no danger of injury to the finish along the heated bottom of the kettle, whether said finish is of vitreous enamel or otherwise. Where the rim is supported entirely by the side walls of the kettle, a minimum number only of contact points with the kettle are required, the weight of the rim acting to maintain it properly in centered relation to the kettle. Preferably the rim has outwardly extending arms for suspending the rim from the upper edge of the kettle. As hereinafter described, the arms are formed with kettle edge engaging terminals and are bent upwardly above the rim towards the terminals so as to act as guides while inserting a food containing basket. With such an arrangement, there is less likelihood of accidentally upsetting or disturbing the rim while inserting the basket. Also, the terminals on the arms being at a substantial distance from the frying zone, are not likely to be covered with fat from frying operations, so that the arms may be grasped and held readily when removing the rim, even though the fat contained in the kettle is highly heated.

When the kettle is constructed of agateware, the suspension of the rim above the level of the fat removes all points of contact between the rim and kettle from the fat so that danger of contaminating the food with chips of enamel broken off during frying operations is eliminated. Also, the arms in the construction illustrated being relatively long provide a slight yield in the support for the rim on the kettle so that the effect of sharp impacts are avoided and the enamel surface will not be chipped even along the edge of the kettle.

Another feature of the invention relates to the use of a temperature indicator having a temperature responsive element secured to the foam controlling rim and extending in proximity to one of the arms on which there is a temperature designating scale, the angle through which the arm extends providing easy visibility of the scale during frying operations. These and other features of the invention including certain details of constructions and combinations of parts are hereinafter described in the following detailed specification, and more particularly pointed out in the appended claims.

In the drawing Figure 1 is a view in vertical section on a frying apparatus embodying the features of the present invention; Figure 2 is a plan view of the apparatus illustrated in Figure 1; Figure 3 is a detail sectional view of one of the rim supporting arms including the temperature indicator of the apparatus; and Figure 4 is a detail sectional view illustrating another arm embodying a modified construction.

The frying apparatus illustrated in the drawing is similar in certain respects to that of inventor's application Serial No. 160,615 which is intended more particularly for use with polished sheet metal construction. The apparatus consists of a kettle or pan 10 having mounted within the fat containing space thereof a foam controlling rim 12 for separating the space within the kettle into a central frying zone 14 and foam receiving channel 16 between the rim 12 and the side of the kettle 10, the channel 16 being of sufficient width to cause disintegration along a surface of heated fat of all the foam overflowing the rim. In the apparatus of both the applications, the rim is supported directly by engagement with the bottom of the kettle and has a tendency to mark or otherwise injure the finish on the bottom surface of the kettle due to jostling of the parts whenever a food containing basket is inserted or removed, the effect being particularly troublesome when the kettle is heated to a high temperature along its outer bottom surface. The kettle 10 and the foam controlling rim of the present application is composed of vitreous enamelware produced by dipping the parts in a molten bath of agate or porcelain-like composition. When hardened, the enamelware has a high glossy finish so that if a construction is employed in which the foam controlling rim is supported directly by engagement with the heated bottom of the kettle, the danger of marking or chipping the glossy surfaces of the parts is greater than with the use of polished metal.

According to the present invention the foam controlling rim 12 is suspended entirely by engagement with the side walls of the kettle out of contact with the heated kettle bottom. To suspend the rim 12 it is formed with three outwardly extending arms 18, 20 and 22. The arms also extend upwardly, being bent with uninterrupted curvatures at the junctions of the rim and arms from the upper edge of the rim towards the upper edge of the kettle so as to hold the rim below the edge of the kettle with its lower edge immersed in the fat contained in the kettle. The terminals of the arms are bent into angular relation with the arms themselves to engage as large a surface as possible along the upper edge of the kettle which is provided with a substantially radial flange 24. To locate the rim in a central position within the kettle, the bend which produces the terminals on the arms is so formed that the inner edge of the flange 24 enters the angle of the bend. Also the terminals of the arms are preferably provided with slightly hooked downwardly extending nibs 26 to contact the outer edges of the flange 24 and to provide means by which the rim may readily be lifted from the kettle without reaching inside where there is danger of being burnt when the fat is heated. Due to the distance from the rim through which the arms extend, there is a substantial yield in the support provided by the arms so that, even if the rim is accidentally dropped into the kettle, there is little likelihood that the enamel will become chipped. In order to stiffen the arms, narrow flanges 28 are bent downwardly from the edges of the arms throughout their lengths at either edge thereof.

In the frying apparatus of the applications referred to, a temperature indicator in the form of a thermometer is mounted in the rim in a manner to be detached easily for cleaning purposes. In the apparatus of the present invention a thermometer is attached to the rim 12 in a manner which, while rendering it readily detachable, obviates the necessity of removal for cleaning.

The thermometer of the present invention comprises a channel shaped housing 30 to one side flange of which is secured one end of a bent bi-metallic strip 32, and the other end of which has fastened to it an indicator 34. The housing 30 is constructed of uncoated sheet metal and has a number of tabs 36 extending from its flanged sides to cooperate with correspondingly spaced slits in the rim so that when the tabs are inserted and bent over, the housing is held in place by the interlocking relation of the tabs in the slits. The indicator 34 extends along the rim and forwardly at an angle in parallel relation to the inside of the arm 22 which is slotted to provide a sight opening for the indicator. In forming the sight opening in the arm 22, a portion of the arm is struck out to form a bar 38 displaced at a distance from the plane of the arm, and the indicator 34 is located between the bar and the arm, the bar acting as a protection for the indicator. In order to render the bi-metallic strip 32 more quickly responsive to changes in temperature of the fat in the frying zone 14, the rim is cut out at 40 to form a passage through which the heated fat can circulate. Along the upper edge of the sight opening for the indicator 34, there are a number of scale markings 42 which correspond roughly to those ordinarily employed in deep fat frying practice. These markings need not be spaced according to any definite scale markings, but for practical purposes may carry the indicia, "low," "medium," and "high."

In order to support a food containing basket such as that indicated at 44 in Figure 4, above the surface of the fat within the kettle so as to drain articles of food contained in the basket one of the rim supporting arms may have struck out from it a vertical tongue 46, upon the upper edge of which a flange element 48 on the basket 44 may be hooked. The uninterrupted curvatures at the junctions between the rim and arms assist in guiding the food basket into the frying zone of the kettle without obstruction, particularly when the vertical tongue 46 is not used. The arms 18, 20 and 22 also may be formed with suitable configurations to provide arched cross-sections for stiffening purposes or with other shapes in order to render the rims more readily cleansed and manipulated.

The nature and scope of the invention having been indicated, and a particular embodiment of the invention having been specifically described, what is claimed is:

1. A frying apparatus having, in combination, an open kettle having a flanged upper edge about its sides and a removable foam controlling rim having outwardly bent arms for suspending the rim on the upper kettle edge with the fat containing space within the kettle separated into a central frying zone and a foam receiving channel around the frying zone, said arms being formed within angularly disposed terminals engaging the flanged edge of the kettle throughout their lengths and forming uninterrupted curved surfaces at the junctions of the rim and arms to guide the food basket into the frying zone without obstruction.

2. A frying apparatus having, in combination, an open kettle, a foam controlling rim substantially smaller in size than the kettle having outwardly extending arms for suspending the rim from the side walls of the kettle, a temperature responsive element secured to the rim and provided with an indicator extending into proximity to one of the arms, and scale designations on said arm opposite said indicator.

3. A frying apparatus having, in combination, an open kettle, a foam controlling rim substantially smaller in size than the kettle having outwardly extending arms for suspending the rim from the side walls of the kettle, a temperature responsive element secured to the outer side of said rim to be immersed in fat between the rim and the kettle, an indicator connected to said temperature responsive element extending into proximity to one of the arms, and a slot in said arm through which the indicator is visible.

4. A frying apparatus having, in combination, an open kettle, a foam controlling rim substantially smaller in size than the kettle having outwardly extending arms for suspending the rim from the side walls of the kettle, a temperature responsive element secured to the outer side of said rim to be immersed in fat between the rim and the kettle, an indicator connected to said temperature responsive element extending into proximity to one of the arms, a bar struck from the material of said arm to form a slot through which the indicator is visible and a guard for the end of the indicator.

5. A frying apparatus having, in combination, an open kettle, a foam controlling rim within the kettle, and a temperature indicator comprising a temperature responsive element and a sheet metal housing in which said element is permanently mounted secured to said rim by bent-over tabs interlocking with said rim to render the indicator readily replaceable.

6. A frying apparatus having, in combination, an open kettle arranged for heating along its bottom surface, a foam controlling rim of relatively thin sheet metal coated with vitreous agate material supported out of contact with the bottom surface of the kettle and a temperature indicator comprising a temperature responsive element and a housing of uncoated sheet metal in which said element is permanently mounted secured to said rim by tabs formed of the uncoated metal bent over into interlocking relation with coated portions of the rim to render the indicator readily replaceable.

7. A frying apparatus having, in combination, a relatively shallow open kettle, a foam controlling rim substantially smaller in size than the kettle having outwardly extending arms for suspending the rim on the upper edge of the kettle with the fat containing space within the kettle separated into a central frying zone and a foam receiving channel around the frying zone of sufficient width to cause disintegration of the foam overflowing the rim, and a tongue struck out of one of the arms for supporting a food receiving basket above the surface of the fat in the kettle for drainage purposes.

KENNETH L. CHILDS.